(12) United States Patent
Qiao

(10) Patent No.: US 11,631,409 B2
(45) Date of Patent: Apr. 18, 2023

(54) DEVICE CONTROL METHOD AND APPARATUS

(71) Applicant: BEIJING XIAOMI PINECONE ELECTRONICS CO., LTD., Beijing (CN)

(72) Inventor: Guohui Qiao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 126 days.

(21) Appl. No.: 17/214,489

(22) Filed: Mar. 26, 2021

(65) Prior Publication Data
US 2021/0407505 A1  Dec. 30, 2021

(30) Foreign Application Priority Data

Jun. 28, 2020  (CN) .......................... 202010597597.8

(51) Int. Cl.
*G10L 15/22* (2006.01)
*G10L 15/08* (2006.01)
*G10L 15/30* (2013.01)

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01); *G10L 2015/228* (2013.01)

(58) Field of Classification Search
USPC ..................................... 704/1–504, 275, 270
See application file for complete search history.

(56) References Cited

U.S. PATENT DOCUMENTS

| 8,488,916 | B2 * | 7/2013 | Terman ..................... G09B 5/08 |
| | | | 382/187 |
| 9,501,666 | B2 * | 11/2016 | Lockett ................... H04L 63/08 |
| 9,667,784 | B2 * | 5/2017 | Wang .................... H04M 3/487 |

(Continued)

FOREIGN PATENT DOCUMENTS

| CN | 109100943 A | 12/2018 |
| CN | 109803003 A | 5/2019 |

(Continued)

OTHER PUBLICATIONS

Extended European Search Report in the European Application No. 21165090.8 dated Sep. 23, 2021, (13p).

*Primary Examiner* — Marcus T Riley
(74) *Attorney, Agent, or Firm* — Arch & Lake LLP

(57) ABSTRACT

Provided are a device control method and apparatus. The method is applied to a server, and includes: receiving user voice instruction information, wherein the user voice instruction information is sent by a voice acquisition device after acquiring a user voice instruction, and the user voice instruction information indicates to-be-processed information and an information processing mode; determining, from a device set according to device information of devices in the device set, a target device capable of processing the to-be-processed information in the information processing mode, wherein the device set comprises the voice acquisition device, and all devices in the device set are bound to a same login account for logging into the server; and controlling the target device to process the to-be-processed information in the information processing mode.

20 Claims, 2 Drawing Sheets

User voice instruction information is received. The user voice instruction information is sent by a voice acquisition device after acquiring a user voice instruction, and the user voice instruction information indicates to-be-processed information and an information processing mode — 101

A target device capable of processing the to-be-processed information in the information processing mode is determined from a device set according to device information of devices in the device set. The device set includes the voice acquisition device, and all of the devices in the device set are bound to a same login account for logging into the server — 102

The target device is controlled to process the to-be-processed information in the information processing mode — 103

(56) References Cited

U.S. PATENT DOCUMENTS

| | | | |
|---|---|---|---|
| 9,949,697 B2* | 4/2018 | Iscoe | G06T 7/0016 |
| 10,402,501 B2* | 9/2019 | Wang | G10L 15/22 |
| 10,466,962 B2* | 11/2019 | Wilberding | H04N 21/43615 |
| 10,580,413 B2* | 3/2020 | Zhang | G06F 21/32 |
| 10,726,861 B2* | 7/2020 | Flaks | G10L 21/028 |
| 10,977,452 B2* | 4/2021 | Wang | G10L 15/1822 |
| 11,175,888 B2* | 11/2021 | Wilberding | H04N 21/43615 |
| 11,288,039 B2* | 3/2022 | Wilberding | G06F 3/04817 |
| 2007/0208686 A1* | 9/2007 | Gupta | H04L 67/303 |
| 2015/0319617 A1* | 11/2015 | Wang | H04W 12/08 |
| | | | 455/411 |
| 2017/0329943 A1* | 11/2017 | Choi | G06F 21/10 |
| 2018/0314689 A1* | 11/2018 | Wang | G10L 15/1822 |
| 2019/0102145 A1* | 4/2019 | Wilberding | H04N 21/43615 |
| 2019/0147885 A1* | 5/2019 | Zhang | G06F 21/32 |
| | | | 704/244 |
| 2019/0332680 A1* | 10/2019 | Wang | G10L 15/07 |
| 2019/0341049 A1 | 11/2019 | Cheng et al. | |
| 2020/0089469 A1* | 3/2020 | Wilberding | G10L 15/08 |
| 2020/0192731 A1* | 6/2020 | Dong | H04L 67/60 |
| 2020/0326909 A1* | 10/2020 | Wilberding | G10L 15/08 |
| 2021/0141600 A1* | 5/2021 | Wilberding | G06F 3/04817 |
| 2021/0407505 A1* | 12/2021 | Qiao | G06F 3/167 |

FOREIGN PATENT DOCUMENTS

| | | |
|---|---|---|
| CN | 110322878 A | 10/2019 |
| CN | 111308921 A | 6/2020 |

\* cited by examiner

DEVICE CONTROL METHOD AND APPARATUS

CROSS-REFERENCE TO RELATED APPLICATION

The present application is based upon and claims priority to Chinese Patent Application 202010597597.8, filed on Jun. 28, 2020, the disclosure of which is hereby incorporated by reference in its entirety for all purposes.

TECHNICAL FIELD

The present disclosure relates to the technical field of computer communications, and more particularly, to a device control method and apparatus.

BACKGROUND

With rapid development of voice interaction technologies in recent years, a voice recognition module is added to a device, such that the device can recognize a voice instruction given by a user and execute an operation indicated by the voice instruction. The user controls operation of a device by voice, having the advantages of convenience in operation, time saving and the like.

Presently, when controlling operation of a device by voice, the user needs to speak out a device name and an operation to be executed by the device, so that a server controls, according to user voice instruction information, the device with the device name to execute the corresponding operation. For example, the user says "pause the loudspeaker box", and then the server controls the loudspeaker box to pause the audio play. The existing voice control mode is relatively single.

SUMMARY

In order to overcome the problem in the related art, a device control method and apparatus are provided in the disclosure.

According to a first aspect of the present disclosure, a device control method is provided, which may be applied to a server, and include: receiving user voice instruction information, wherein the user voice instruction information is sent by a voice acquisition device after acquiring a user voice instruction, and the user voice instruction information indicates to-be-processed information and an information processing mode; determining, from a device set according to device information of devices in the device set, a target device capable of processing the to-be-processed information in the information processing mode, wherein the device set includes the voice acquisition device, and all devices in the device set are bound to a same login account for logging into the server; and controlling the target device to process the to-be-processed information in the information processing mode.

According to a second aspect of the present disclosure, provided is a server, including a processor; and a memory, configured to store processor-executable instructions, wherein the processor is configured to: receive user voice instruction information, wherein the user voice instruction information is sent by a voice acquisition device after acquiring a user voice instruction, and the user voice instruction information indicates to-be-processed information and an information processing mode; determine, from a device set according to device information of devices in the device set, a target device capable of processing the to-be-processed information in the information processing mode, wherein the device set includes the voice acquisition device, and all devices in the device set are bound to a same login account for logging into the server; and control the target device to process the to-be-processed information in the information processing mode.

According to a third aspect of the present disclosure, provided is a non-transitory computer-readable storage medium having stored thereon a computer program that, when being executed by a processor, implemented a device control method. The device control method may be applied to a server, and include: receiving user voice instruction information, wherein the user voice instruction information is sent by a voice acquisition device after acquiring a user voice instruction, and the user voice instruction information indicates to-be-processed information and an information processing mode; determining, from a device set according to device information of devices in the device set, a target device capable of processing the to-be-processed information in the information processing mode, wherein the device set includes the voice acquisition device, and all devices in the device set are bound to a same login account for logging into the server; and controlling the target device to process the to-be-processed information in the information processing mode.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments of the present disclosure, examples of which are illustrated in the accompanying drawings. The following description refers to the accompanying drawings in which the same numbers in different drawings represent the same or similar elements unless otherwise represented. The implementations set forth in the following description of embodiments of the present disclosure do not represent all implementations consistent with the present disclosure. Instead, they are merely examples of apparatuses and methods consistent with aspects related to the present disclosure as recited in the appended claims.

Terms used in the present disclosure are only used for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first", "second", "third" and the like may be used to describe various information in the present disclosure, the information should not be limited to these terms. These terms are only used to distinguish the information of the same type. For example, without departing from the scope of the present disclosure, first information may also be called second information and, and similarly, second information may also be called first information. For example, term "if" used here may be explained as "while" or "when" or "responsive to determining", which depends on the context.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
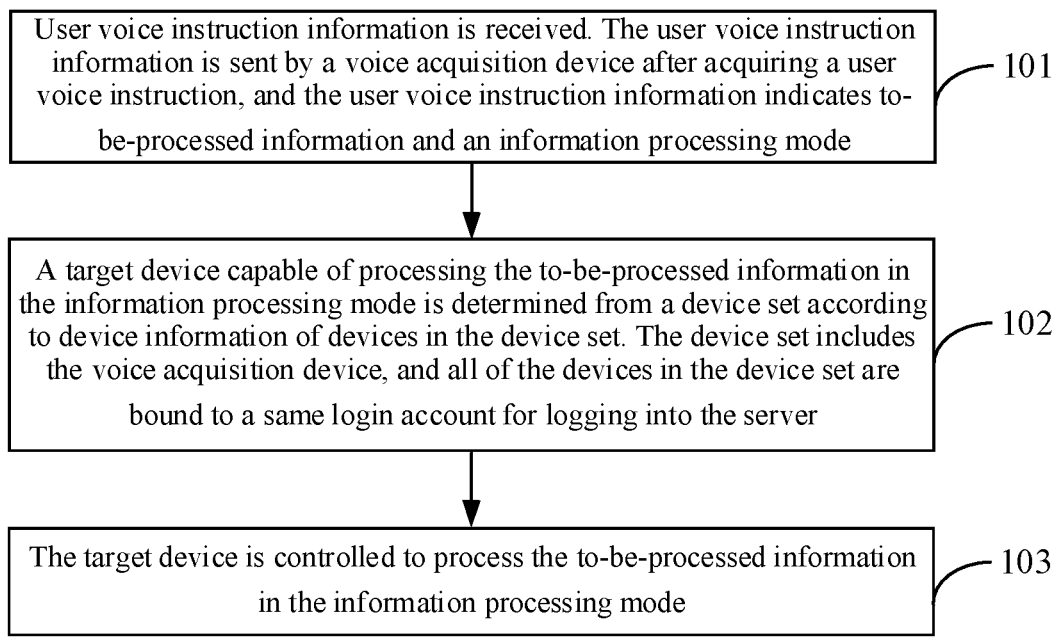
FIG. 1 illustrates a flowchart of a device control method according to an example of the present disclosure.

FIG. 1 illustrates a flowchart of a device control method according to an example of the present disclosure. The method as illustrated in in FIG. 1 may be applied to a server and include the following actions 101 to 103.

In 101, user voice instruction information is received. The user voice instruction information is sent by a voice acquisition device after acquiring a user voice instruction. The user voice instruction information indicates to-be-processed information and an information processing mode.

In one or more embodiments of the present disclosure, the voice acquisition device has a voice acquisition function. There may be a variety of applicable voice acquisition devices, such as smart home devices having the voice acquisition function, mobile phones, tablets and laptops. The smart home devices may be loudspeaker boxes, refrigerators, washing machines, air conditioners, televisions and the like.

The user sends the user voice instruction when the user wants to use a device. The voice acquisition device acquires the user voice instruction and then performs semantic analysis on the user voice instruction to obtain the user voice instruction information.

The user voice instruction information indicates the to-be-processed information and the information processing mode. For example, the user says "turn down the volume". In this case, the to-be-processed information indicated by the user voice instruction information is sound, and the information processing mode indicated is to turn down the volume of the sound.

In one or more embodiments, wakeup software is installed in the voice acquisition device; and the voice acquisition device is woken up when receiving preset wakeup information. The preset wakeup information may be a wakeup word, such as the "Mi AI". When multiple voice acquisition devices with the same wakeup information are provided in the space where the user is located, the multiple voice acquisition devices may be woken up by using the same piece of wakeup information sent out by the user. After being woken up, the multiple voice acquisition devices respectively acquire the user voice instruction and send the user voice instruction information to the server.

In this case, multiple voice acquisition devices may be provided to acquire the user voice instruction and send the user voice instruction information.

In one case, the multiple voice acquisition devices are connected to a same network. For example, the multiple voice acquisition devices are connected to the same local area network. In another case, the multiple voice acquisition devices are connected to different networks. For example, the multiple voice acquisition devices are connected to different local area networks. For another example, some of the multiple voice acquisition devices are connected to a local area network, and the others are connected to a mobile network. Exemplarily, in the smart home scenario, a smart home device is connected to the local area network, a mobile phone is connected to a mobile network, and both the smart home device and the mobile phone are bound to the same login account for logging into the server.

In some embodiments, when the multiple voice acquisition devices are connected to different networks, the multiple voice acquisition devices may be woken up by using the same wakeup information sent by the user. Compared with the case that nearby devices to be woken up must be within the same local area network as the voice acquisition device and a device can be woken up only if it is within the same local area network as the voice acquisition device, the devices connected to different networks can be woken up in the embodiment, thereby solving the shortage of the nearby-wakeup solution, and realizing wakeup of and control over the devices that cannot to be woken up in the nearby wakeup solution.

In 102, a target device capable of processing the to-be-processed information in the information processing mode is determined from a device set according to device information of devices in the device set. The device set includes the voice acquisition device, and all of the devices in the device set are bound to a same login account for logging into the server.

The device information may include a processable information type and a usable information processing mode. For example, the information type processable by the loudspeaker box includes sound, and the information processing mode usable by the loudspeaker box includes starting sound playing, pausing sound playing, turning up the volume of sound, turning down the volume of sound and the like.

Functional software is installed in the voice acquisition device. After the login account is used by the functional software, the voice acquisition device is bound to the login account. Upon receiving the user voice instruction information sent from the voice acquisition device, the server may determine the login account to which the voice acquisition device is bound, and then determine device information of all devices bound to the login account.

In application, the server may predetermine all the devices bound to the login account, and establish a corresponding relationship between the login account and device information of all the bound devices. The server may provide a device list for the login account, and put the device information of all the devices bound to the login account into the device list.

In the embodiment, as different devices have different processable information types and usable information processing modes, the server may determine, from the device set according to the to-be-processed information and the information processing mode indicated by the user voice instruction information as well as the device information of the devices in the device set, the target device capable of processing the to-be-processed information in the indicated information processing mode. For example, in the case where the device set includes a loudspeaker box and a refrigerator, when the user says "turn down the volume", the server determines that the device capable of turning down the volume of sound is the loudspeaker box and determines the loudspeaker box as the target device.

The target device may include one or more devices. The target device may include the voice acquisition device sending the user voice instruction information, or may not include the voice acquisition device sending the user voice instruction information.

In an embodiment, besides the processable information type and the usable information processing mode, the device information may further include at least one of the following: work state information, or device position information.

The work state information indicates a present work state of the device, such as a wakeup state, a non-wakeup state, a device temperature, an operation duration, and a device parameter used in the present work state.

The device position information indicates a present position of the device, such as room information of a room where the device is located, position information of the device in the room, and position information obtained by using a positioning apparatus. The positioning apparatus may be a Global Positioning System (GPS) apparatus.

In an embodiment, the device information may include the work state information. The server may determine the target device in the following way: the server determines, from the device set according to the device information of the devices in the device set, the target device capable of processing the to-be-processed information in the information processing mode in a present work state.

Operations that can be executed by the device in different work states are different. For example, the loudspeaker box can execute the operation of turning down the volume when playing audio, and cannot execute the operation of turning down the volume when not playing audio.

Exemplarily, both the living room and the bedroom are provided with a loudspeaker box. The loudspeaker box in the living room is playing music, and the loudspeaker box in the bedroom is not playing audio. In this case, when the user says "pause the playing" in the bedroom, as the loudspeaker box in the bedroom is not playing audio presently and cannot execute the operation of pause audio playing, the loudspeaker box in the living room is determined as the target device.

In the embodiment, the server determines the target device in combination with the present work state of the devices in the device set, such that the determined result is more accurate.

In an embodiment, the device information may further include the device position information, and the server may determine the target device in the following way: the server determines, from the device set according to the device information of the devices in the device set, the target device that is capable of processing the to-be-processed information in the information processing mode and is located within a position region where the voice acquisition device is located.

There may be a variety of position regions where the voice acquisition device is located, such as the room where the voice acquisition device is located, and the geographic region where the voice acquisition device is located.

In the embodiment, the target device determined by the server may only include the voice acquisition device, or may include the voice acquisition device and another device, or may include another device only. When the target device includes another device, the another device is located within the same position region as the voice acquisition device.

For example, the room A is provided with a loudspeaker box and an air conditioner, and the room B is provided with an air conditioner. The user says "rise the temperature" in the room A, and the loudspeaker box acquires the user voice instruction and sends the user voice instruction information to the server. Both the air conditioner in the room A and the air conditioner in the room B can execute the operation of rising the temperature, but as the air conditioner in the room A is located in the same room as the loudspeaker box, the server determines the air conditioner in the room A as the target device.

In an embodiment, the operation that the server determines, from the device set according to the device information of the devices, the target device that is capable of processing the to-be-processed information in the information processing mode and is located within the position region where the voice acquisition device is located may be implemented in the following way. In the first action, whether the voice acquisition device is capable of processing the to-be-processed information in the information processing mode is determined according to device information of the voice acquisition device. The second action is executed in the case where the voice acquisition device is capable of processing the to-be-processed information in the information processing mode. and the third action is executed in the case where the voice acquisition device is not capable of processing the to-be-processed information in the information processing mode. In the second action, the voice acquisition device is determined as the target device. In the third action, according to device information of remaining devices except for the voice acquisition device in the device set, the target device that is capable of processing the to-be-processed information in the information processing mode and is located within the same position region as the voice acquisition device is determined from the other devices.

In the embodiment, in the case where the voice acquisition device can execute the operation indicated by the user voice instruction information, the voice acquisition device is determined as the target device. The voice acquisition device is preferentially used to execute the operation. In the case where the voice acquisition device cannot execute the operation, another device that is capable of executing the operation and is located within the same position region as the voice acquisition device is determined as the target device, and the another device is used to execute the operation.

For example, the room is provided with a loudspeaker box and an air conditioner. The user says "rise the temperature", and the loudspeaker box acquires the user voice instruction and sends the user voice instruction information to the server. The server first determines whether the loudspeaker box is capable of executing the operation of rising the temperature, and after determining that the loudspeaker box cannot execute the operation of rising the temperature, determines the air conditioner that is capable of executing the operation of rising the temperature and is located in the same room as the loudspeaker box as the target device.

In an embodiment, the information processing mode may include at least two information processing submodes. For example, in the case where the user says "start navigation", the required information processing mode includes: display of navigation information, and voice broadcast of the navigation information.

In this case, for each of the at least two information processing submodes, the server may determine, from the device set according to the device information of the devices in the device set, a target device capable of executing the information processing submode.

For example, the server determines the television for displaying the navigation information and the loudspeaker box for voice broadcast of the navigation information, and determines both the television and the loudspeaker box as target devices.

In 103, the target device is controlled to process the to-be-processed information in the information processing mode.

In an embodiment, the device information may further include the work state information, and the work state information may include: wakeup information or non-wakeup information.

When the device information of the target device includes the non-wakeup information, the server determines, according to the device information of the target device, that the target device is in a non-wakeup state at present, controls the non-wakeup target device to process the to-be-processed information in the information processing mode and controls the non-wakeup target device to execute the operation.

In application, the server may control, by using a persistent connection technology, the non-wakeup target device to process the to-be-processed information in the information processing mode. The server may further use other technologies to control the non-wakeup target device to process the to-be-processed information in the information processing mode, and no limitation is set in the present disclosure.

In the embodiment, it is realized that a non-wakeup device is controlled to perform an operation, enriching the control functions.

In an embodiment, in the case where the information processing mode includes at least two information processing submodes, after the server determines the target devices capable of executing the information processing submodes from the device set, the server may control each target device to perform information processing in a corresponding information processing submode. The operation is accomplished with collaborative cooperation between multiple target devices.

For example, the server determines the television for displaying the navigation information and the loudspeaker box for voice broadcast of the navigation information, determines the television and the loudspeaker box as target devices, controls the television to display the navigation information and controls the loudspeaker box to perform voice broadcast of the navigation information.

The embodiments of the present disclosure provide a new voice control method, by which a user can control an appropriate device to perform an operation, by only speaking out operation content desired to be executed by the device, without the need to speak out a device name of a device to be controlled, thereby improving use experience of the user.

For simple description, each of the above method embodiments is expressed as a combination of a series of operations, but those skilled in the art should know that the present disclosure is not limited to the described operation sequence because some actions may be executed in other sequences or at the same time according to the present disclosure.

The person skilled in the art should also appreciate that all the embodiments described in the specification are optional embodiments, and the related actions and modules are not necessarily mandatory to the present disclosure.

Corresponding to the above method embodiment realizing the application function embodiment, the present disclosure further provides an apparatus embodiment realizing the application function and a corresponding terminal.

Figure 2:
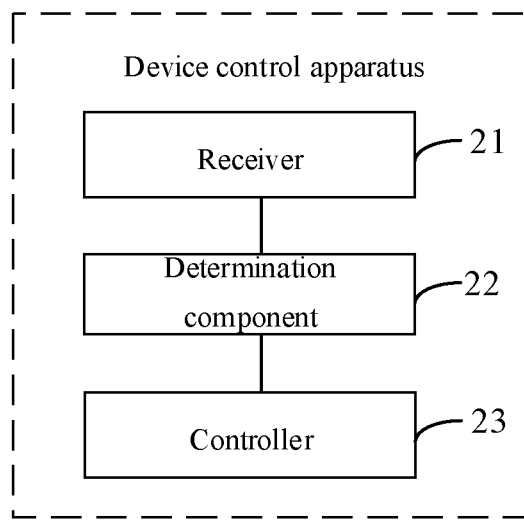
FIG. 2 illustrates a block diagram of a device control apparatus according to an example of the present disclosure.

FIG. 2 illustrates a block diagram of a device control apparatus according to an embodiment of the present disclosure. The apparatus may be applied to a server, and include: a receiver 21, a determination component 22 and a controller 23.

The receiver 21 is configured to receive user voice instruction information. The user voice instruction information is sent by a voice acquisition device after acquiring a user voice instruction, and the user voice instruction information indicates to-be-processed information and an information processing mode.

The determination component 22 is configured to determine, from a device set according to device information of devices in the device set, a target device capable of processing the to-be-processed information in the information processing mode. The device set includes the voice acquisition device, and all of the devices in the device set are bound to a same login account for logging into the server.

The controller 23 is configured to control the target device to process the to-be-processed information in the information processing mode.

In an optional embodiment, on the basis of the device control apparatus illustrated in FIG. 2, the information processing mode may include at least two information processing submodes.

The determination component is configured to: for each of the at least two information processing submodes, determine, from the device set according to the device information of the devices, a target device capable of executing the information processing submode.

In an optional embodiment, the controller 23 may be configured to: control each target device to perform information processing in a corresponding information processing submode.

In an optional embodiment, the device information may include a processable information type and an executable information processing mode.

In an optional embodiment, the device information may further include at least one of the following: work state information, or device position information.

In an optional embodiment, the device information may include the work state information. The determination component is configured to determine, from the device set according to the device information of the devices, the target device capable of processing the to-be-processed information in the information processing mode in a present operation sate.

In an optional embodiment, the device information may include the work state information, and the work state information may include: wakeup information or non-wakeup information.

The controller 23 may be configured to: in response to that the device information of the target device includes the non-wakeup information, control the non-wakeup target device to process the to-be-processed information in the information processing mode.

In an optional embodiment, the device information may include the device position information.

The determination component 22 may be configured to determine, from the device set according to the device information of the devices, the target device that is capable of processing the to-be-processed information in the information processing mode and is located within a position region where the voice acquisition device is located.

In an optional embodiment, the determination component 22 may include: a first determination sub-component, a second determination sub-component and a third determination sub-component.

The first determination sub-component is configured to determine, according to device information of the voice acquisition device, whether the voice acquisition device is capable of processing the to-be-processed information in the information processing mode.

In response to that the voice acquisition device is capable of processing the to-be-processed information in the information processing mode, the second determination sub-component is configured to determine the voice acquisition device as the target device.

In response to that the voice acquisition device is not capable of processing the to-be-processed information in the information processing mode, the third determination sub-component is configured to determine, from remaining devices in the device set except for the voice acquisition device according to device information of the remaining devices, the target device that is capable of processing the to-be-processed information in the information processing mode and is located within the same position region as the voice acquisition device.

In an optional embodiment, on the basis of the device control apparatus as illustrated in FIG. 2, a plurality of voice acquisition devices are provided to acquire the user voice instruction and send the user voice instruction information. The plurality of voice acquisition devices are connected to different networks, and are woken up by using a same piece of wakeup information sent by a user.

The device embodiment basically corresponds to the method embodiment, so the description in the method embodiment may be referred to for relevant part. The above described device embodiment is merely illustrative. The elements described as separate parts may or may not be physically separate, and parts displayed as elements may be located in one position, or may be distributed on a plurality of network units. Some or all of the components may be selected according to actual needs to achieve the objectives of the solutions of the present disclosure. Those of ordinary skill in the art may understand and implement the present disclosure without creative work.

Figure 3:
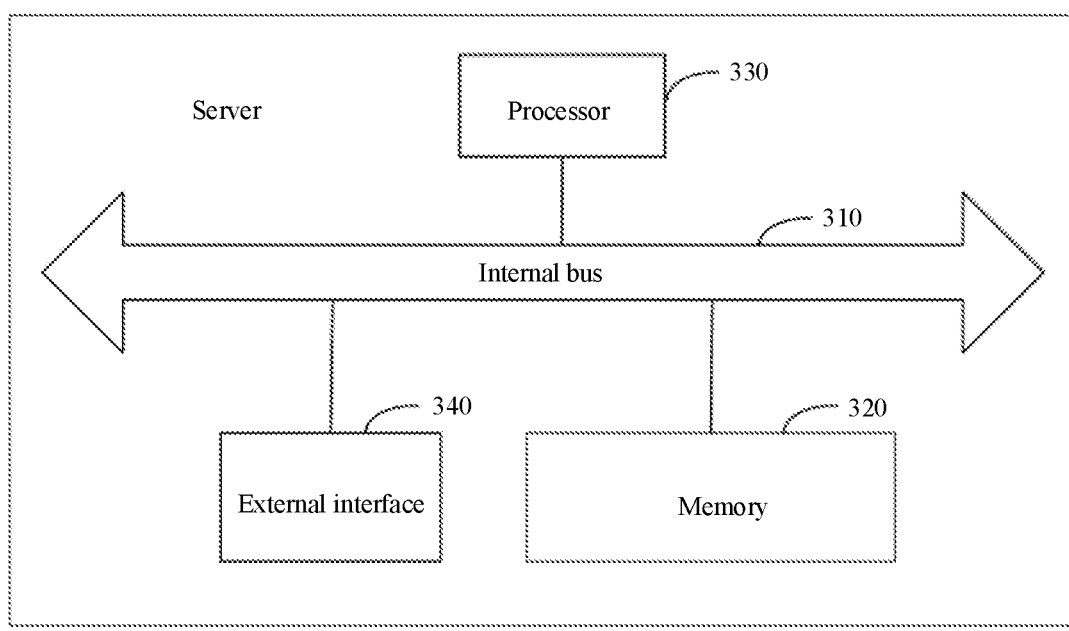
FIG. 3 illustrates a structural schematic diagram of a server according to an example of the present disclosure.

FIG. 3 illustrates a schematic structural diagram of a server according to an embodiment of the present disclosure. The server may include: an internal bus 310, as well as a memory 320, a processor 330 and an external interface 340 that are connected through the internal bus 310.

The external interface 340 is configured to acquire data.

The memory 320 is configured to store machine-readable instructions corresponding to device control.

The processor 330 is configured to read the machine-readable instructions on the memory 320, and execute the machine-executable instructions to implement the following operations.

User voice instruction information is received. The user voice instruction information is sent by a voice acquisition device after acquiring a user voice instruction, and the user voice instruction information indicates to-be-processed information and an information processing mode. A target device capable of processing the to-be-processed information in the information processing mode is determined from a device set according to device information of devices in the device set. The device set includes the voice acquisition device, and all of the devices in the device set are bound to a same login account for logging into the server. The target device is controlled to process the to-be-processed information in the information processing mode.

The technical solutions provided in the embodiments of the present disclosure may have the following beneficial effects.

In the embodiments of the present disclosure, a server receives user voice instruction information that is sent by a voice acquisition device after acquiring a user voice instruction, the user voice instruction information indicating to-be-processed information and an information processing mode; determines, from a device set according to device information of devices in a device set, a target device capable of processing the to-be-processed information in the information processing mode, the device set including the voice acquisition device, and all the devices in the device set being bound to a same login account number for logging in the server; and controls the target device to process the to-be-processed information in the information processing mode. The embodiments of the present disclosure provide a new voice control method, by which a user can control an appropriate device to perform an operation, by only speaking out operation content desired to be executed by the device, without the need to speak out a device name of a device to be controlled, thereby improving use experience of the user.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the embodiments of the disclosure, the computer-readable storage medium may be in various forms. For example, in different examples, the machine readable storage medium may be: a Random Access Memory (RAM), a volatile memory, a non-volatile memory, a flash memory, a storage drive (such as a hard disk drive), a solid state disk, any type of memory disk (such as an optical disc and a Digital Video Disk (DVD)), or a similar storage medium, or a combination thereof. Specially, the computer-readable medium may even be paper or another suitable medium upon which the program can be printed. By use of the medium, the program can be electrically captured (such as optical scanning), and then compiled, interpreted and processed in a suitable manner, and then stored in a computer medium.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

In order to overcome the problem in the related art, a device control method and apparatus are provided in the disclosure.

According to a first aspect of the embodiments of the present disclosure, a device control method is provided, which may be applied to a server, and include: receiving user voice instruction information, wherein the user voice instruction information is sent by a voice acquisition device after acquiring a user voice instruction, and the user voice instruction information indicates to-be-processed information and an information processing mode; determining, from a device set according to device information of devices in the device set, a target device capable of processing the to-be-processed information in the information processing mode, wherein the device set includes the voice acquisition device, and all of the devices in the device set are bound to a same login account for logging into the server; and controlling the target device to process the to-be-processed information in the information processing mode.

In some embodiment, the information processing mode includes at least two information processing submodes; and determining, from the device set according to the device information of the devices in the device set, the target device capable of processing the to-be-processed information in the information processing mode includes: for each of the at least two information processing submodes, determining, from the device set according to the device information of the devices, a target device capable of executing the information processing submode.

In some embodiment, controlling the target device to process the to-be-processed information in the information processing mode includes: controlling each target device to perform information processing in a corresponding information processing submode.

In some embodiment, the device information includes a processable information type and an executable information processing mode.

In some embodiment, the device information further includes at least one of the following: work state information, or device position information.

In some embodiment, the device information includes the work state information; and determining, from the device set according to the device information of the devices in the device set, the target device capable of processing the to-be-processed information in the information processing mode includes: determining, from the device set according to the device information of the devices, the target device capable of processing the to-be-processed information in the information processing mode in a present operation sate.

In some embodiment, the device information includes the work state information, and the work state information includes: wakeup information or non-wakeup information; and controlling the target device to process the to-be-processed information in the information processing mode includes: in response to that the device information of the target device includes the non-wakeup information, controlling the non-wakeup target device to process the to-be-processed information in the information processing mode.

In some embodiment, the device information includes the device position information; and determining, from the device set according to the device information of the devices in the device set, the target device capable of processing the to-be-processed information in the information processing mode includes: determining, from the device set according to the device information of the devices, the target device that is capable of processing the to-be-processed information in the information processing mode and is located within a position region where the voice acquisition device is located.

In some embodiment, determining, from the device set according to the device information of the devices, the target device that is capable of processing the to-be-processed information in the information processing mode and is located within the position region where the voice acquisition device is located includes: determining, according to device information of the voice acquisition device, whether the voice acquisition device is capable of processing the to-be-processed information in the information processing mode; in response to that the voice acquisition device is capable of processing the to-be-processed information in the information processing mode, determining the voice acquisition device as the target device; and in response to that the voice acquisition device is not capable of processing the to-be-processed information in the information processing mode, determining, from remaining devices in the device set except for the voice acquisition device according to device information of the remaining devices, the target device that is capable of processing the to-be-processed information in the information processing mode and is located within the same position region as the voice acquisition device.

In some embodiment, a plurality of voice acquisition devices are provided to acquire the user voice instruction and send the user voice instruction information; and the plurality of voice acquisition devices are connected to different networks, and are woken up by using a same piece of wakeup information sent by a user.

According to a second aspect of the embodiments of the present disclosure, provided is a server, including a processor; and a memory, configured to store processor-executable instructions, wherein the processor is configured to: receive user voice instruction information, wherein the user voice instruction information is sent by a voice acquisition device after acquiring a user voice instruction, and the user voice instruction information indicates to-be-processed information and an information processing mode; determine, from a device set according to device information of devices in the device set, a target device capable of processing the to-be-processed information in the information processing mode, wherein the device set includes the voice acquisition device, and all of the devices in the device set are bound to a same login account for logging into the server; and control the target device to process the to-be-processed information in the information processing mode.

In some embodiment, the information processing mode includes at least two information processing submodes; and the determination module is configured to: for each of the at least two information processing submodes, determine, from the device set according to the device information of the devices, a target device capable of executing the information processing submode.

In some embodiment, the control module is configured to: control each target device to perform information processing in a corresponding information processing submode.

In some embodiment, the device information includes a processable information type and an executable information processing mode.

In some embodiment, the device information further includes at least one of the following: work state information, or device position information.

In some embodiment, the device information includes the work state information; and the determination module is configured to determine, from the device set according to the device information of the devices, the target device capable of processing the to-be-processed information in the information processing mode in a present operation sate.

In some embodiment, the device information includes the work state information, and the work state information includes: wakeup information or non-wakeup information; and the control module is configured to: in response to that the device information of the target device includes the non-wakeup information, control the non-wakeup target device to process the to-be-processed information in the information processing mode.

In some embodiment, the device information further includes the device position information; and the determination module is configured to determine, from the device set according to the device information of the devices, the target device that is capable of processing the to-be-processed information in the information processing mode and is located within a position region where the voice acquisition device is located.

In some embodiment, the determination module includes: a first determination submodule, configured to determine, according to device information of the voice acquisition device, whether the voice acquisition device is capable of processing the to-be-processed information in the information processing mode; a second determination submodule, configured to: in response to that the voice acquisition device is capable of processing the to-be-processed information in the information processing mode, determine the voice acquisition device as the target device; and a third determination submodule, configured to: in response to that the voice acquisition device is not capable of processing the to-be-processed information in the information processing mode, determine, from remaining devices in the device set except for the voice acquisition device according to device information of the remaining devices, the target device that is capable of processing the to-be-processed information in the information processing mode and is located within the same position region as the voice acquisition device.

In some embodiment, a plurality of voice acquisition devices are provided to acquire the user voice instruction and send the user voice instruction information; and the plurality of voice acquisition devices are connected to different networks, and are woken up by using a same piece of wakeup information sent by a user.

According to a third aspect of the embodiments of the present disclosure, provided is a non-transitory computer-readable storage medium having stored thereon a computer program that, when being executed by a processor, implemented actions of the method in the first aspect.

According to a fourth aspect of the embodiments of the present disclosure, provided is a server, including: a processor; and a memory, configured to store processor-executable instructions, wherein the processor is configured to: receive user voice instruction information, wherein the user voice instruction information is sent by a voice acquisition device after acquiring a user voice instruction, and the user voice instruction information indicates to-be-processed information and an information processing mode; determine, from a device set according to device information of devices in the device set, a target device capable of processing the to-be-processed information in the information processing mode, wherein the device set includes the voice acquisition device, and all of the devices in the device set are bound to a same login account for logging into the server; and control the target device to process the to-be-processed information in the information processing mode.

What is claimed is:

1. A device control method, applied to a server, and comprising:
receiving user voice instruction information, wherein the user voice instruction information is sent by a voice acquisition device after acquiring a user voice instruction, and wherein the user voice instruction information indicates to-be-processed information and an information processing mode;
determining, from a device set according to device information of devices in the device set, a target device capable of processing the to-be-processed information in the information processing mode, wherein the device set comprises the voice acquisition device, and wherein all devices in the device set are bound to a same login account for logging into the server; and
controlling the target device to process the to-be-processed information in the information processing mode.

2. The method of claim 1, wherein the information processing mode comprises at least two information processing submodes; and determining, from the device set according to the device information of the devices in the device set, the target device capable of processing the to-be-processed information in the information processing mode comprises:
for each of the at least two information processing submodes, determining, from the device set according to the device information of the devices, a target device capable of executing the information processing submode.

3. The method of claim 1, wherein the device information comprises a processable information type and an executable information processing mode.

4. The method of claim 3, wherein the device information further comprises at least one of the following:
work state information, or
device position information.

5. The method of claim 4, wherein the device information comprises the work state information; and determining, from the device set according to the device information of the devices in the device set, the target device capable of processing the to-be-processed information in the information processing mode comprises:
determining, from the device set according to the device information of the devices, the target device capable of processing the to-be-processed information in the information processing mode in a present operation state.

6. The method of claim 4, wherein the device information comprises the work state information, and the work state information comprises: wakeup information or non-wakeup information; and controlling the target device to process the to-be-processed information in the information processing mode comprises:
in response to that the device information of the target device comprises the non-wakeup information, controlling a non-wake-up target device to process the to-be-processed information in the information processing mode.

7. The method of claim 4, wherein the device information comprises the device position information; and determining, from the device set according to the device information of the devices in the device set, the target device capable of processing the to-be-processed information in the information processing mode comprises:
determining, from the device set according to the device information of the devices, the target device that is capable of processing the to-be-processed information in the information processing mode and is located within a position region where the voice acquisition device is located.

8. The method of claim 7, wherein determining, from the device set according to the device information of the devices, the target device that is capable of processing the to-be-processed information in the information processing mode and is located within the position region where the voice acquisition device is located comprises:
determining, according to device information of the voice acquisition device, whether the voice acquisition device is capable of processing the to-be-processed information in the information processing mode;
in response to that the voice acquisition device is capable of processing the to-be-processed information in the information processing mode, determining the voice acquisition device as the target device; and
in response to that the voice acquisition device is not capable of processing the to-be-processed information in the information processing mode, determining, from remaining devices in the device set except for the voice acquisition device according to device information of the remaining devices, the target device that is capable of processing the to-be-processed information in the information processing mode and is located within the same position region as the voice acquisition device.

9. The method of claim 1, wherein a plurality of voice acquisition devices are provided to acquire the user voice instruction and send the user voice instruction information; and
the plurality of voice acquisition devices are connected to different networks, and are woken up by using a same piece of wakeup information sent by a user.

10. A server, comprising:
a processor; and
a memory, configured to store processor-executable instructions,
wherein the processor is configured to:
receive user voice instruction information, wherein the user voice instruction information is sent by a voice acquisition device after acquiring a user voice instruction, and wherein the user voice instruction information indicates to-be-processed information and an information processing mode;
determine, from a device set according to device information of devices in the device set, a target device capable of processing the to-be-processed information in the information processing mode, wherein the device set comprises the voice acquisition device, and all devices in the device set are bound to a same login account for logging into the server; and
control the target device to process the to-be-processed information in the information processing mode.

11. The server of claim 10, wherein the information processing mode comprises at least two information processing submodes; and
the processor is configured to: for each of the at least two information processing submodes, determine, from the device set according to the device information of the devices, a target device capable of executing the information processing submode.

12. The server of claim 11, wherein processor is configured to:
control each target device to perform information processing in a corresponding information processing submode.

13. The server of claim 10, wherein the device information comprises a processable information type and an executable information processing mode.

14. The server of claim 13, wherein the device information further comprises at least one of the following:
work state information, or
device position information.

15. The server of claim 14, wherein the device information comprises the work state information; and
the processor is configured to determine, from the device set according to the device information of the devices, the target device capable of processing the to-be-processed information in the information processing mode in a present operation state.

16. The server of claim 14, wherein the device information comprises the work state information, and the work state information comprises: wakeup information or non-wakeup information; and
the processor is configured to: in response to that the device information of the target device comprises the non-wakeup information, control a non-wake-up target device to process the to-be-processed information in the information processing mode.

17. The server of claim 14, wherein the device information further comprises the device position information; and
the processor is configured to determine, from the device set according to the device information of the devices, the target device that is capable of processing the to-be-processed information in the information processing mode and is located within a position region where the voice acquisition device is located.

18. The server of claim 17, wherein the processor is configured to:
determine, according to device information of the voice acquisition device, whether the voice acquisition device is capable of processing the to-be-processed information in the information processing mode;
in response to that the voice acquisition device is capable of processing the to-be-processed information in the information processing mode, determine the voice acquisition device as the target device; and
in response to that the voice acquisition device is capable of processing the to-be-processed information in the information processing mode, determine, from remaining devices in the device set except for the voice acquisition device according to device information of the remaining devices, the target device that is capable of processing the to-be-processed information in the information processing mode and is located within the same position region as the voice acquisition device.

19. The server of claim 10, wherein a plurality of voice acquisition devices are provided to acquire the user voice instruction and send the user voice instruction information; and
the plurality of voice acquisition devices are connected to different networks, and are woken up by using a same piece of wakeup information sent by a user.

20. A non-transitory computer-readable storage medium having stored thereon a computer program that, when being executed by a processor, implements a device control method, applied to a server and comprising:
receiving user voice instruction information, wherein the user voice instruction information is sent by a voice acquisition device after acquiring a user voice instruction, and the user voice instruction information indicates to-be-processed information and an information processing mode;
determining, from a device set according to device information of devices in the device set, a target device capable of processing the to-be-processed information in the information processing mode, wherein the device set comprises the voice acquisition device, and all devices in the device set are bound to a same login account for logging into the server; and
controlling the target device to process the to-be-processed information in the information processing mode.

* * * * *